May 2, 1950          E. CHENETTE          2,506,137
SPRING ACTUATED FISHHOOK
Filed Feb. 15, 1947          2 Sheets-Sheet 1
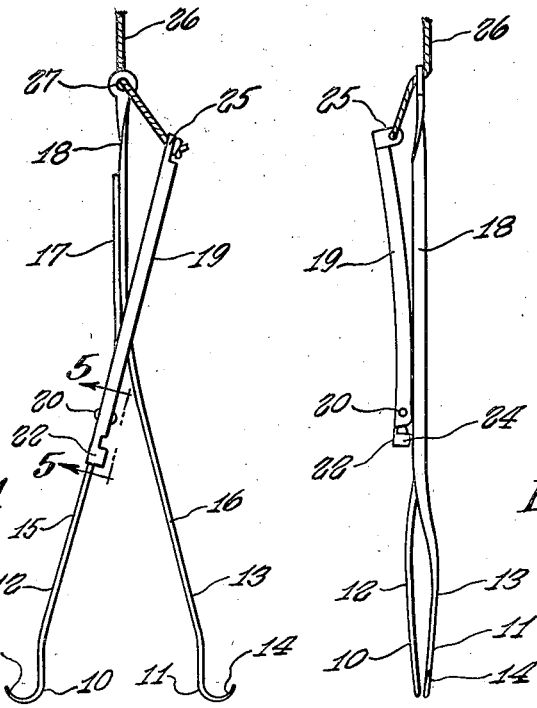
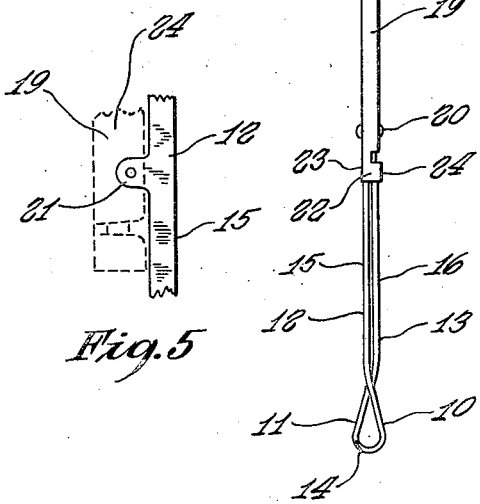
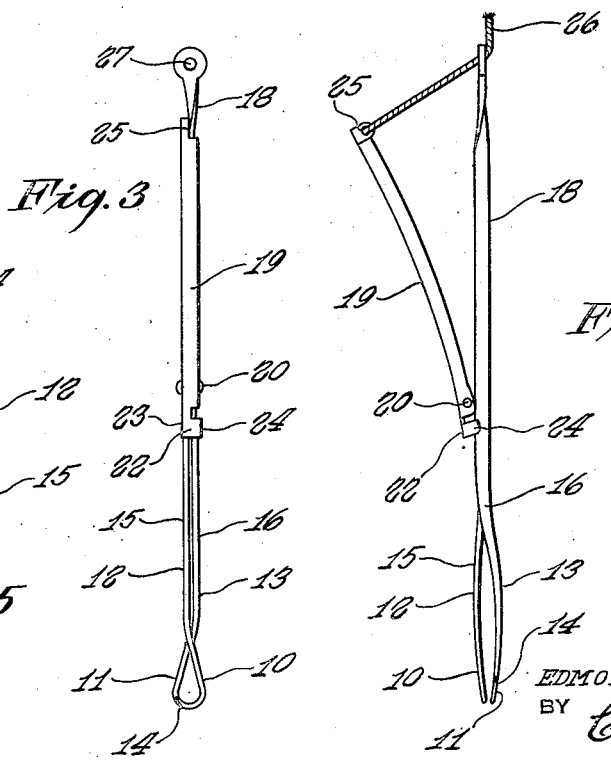
INVENTOR
EDMOND CHENETTE
BY Clark & Ott
ATTORNEYS

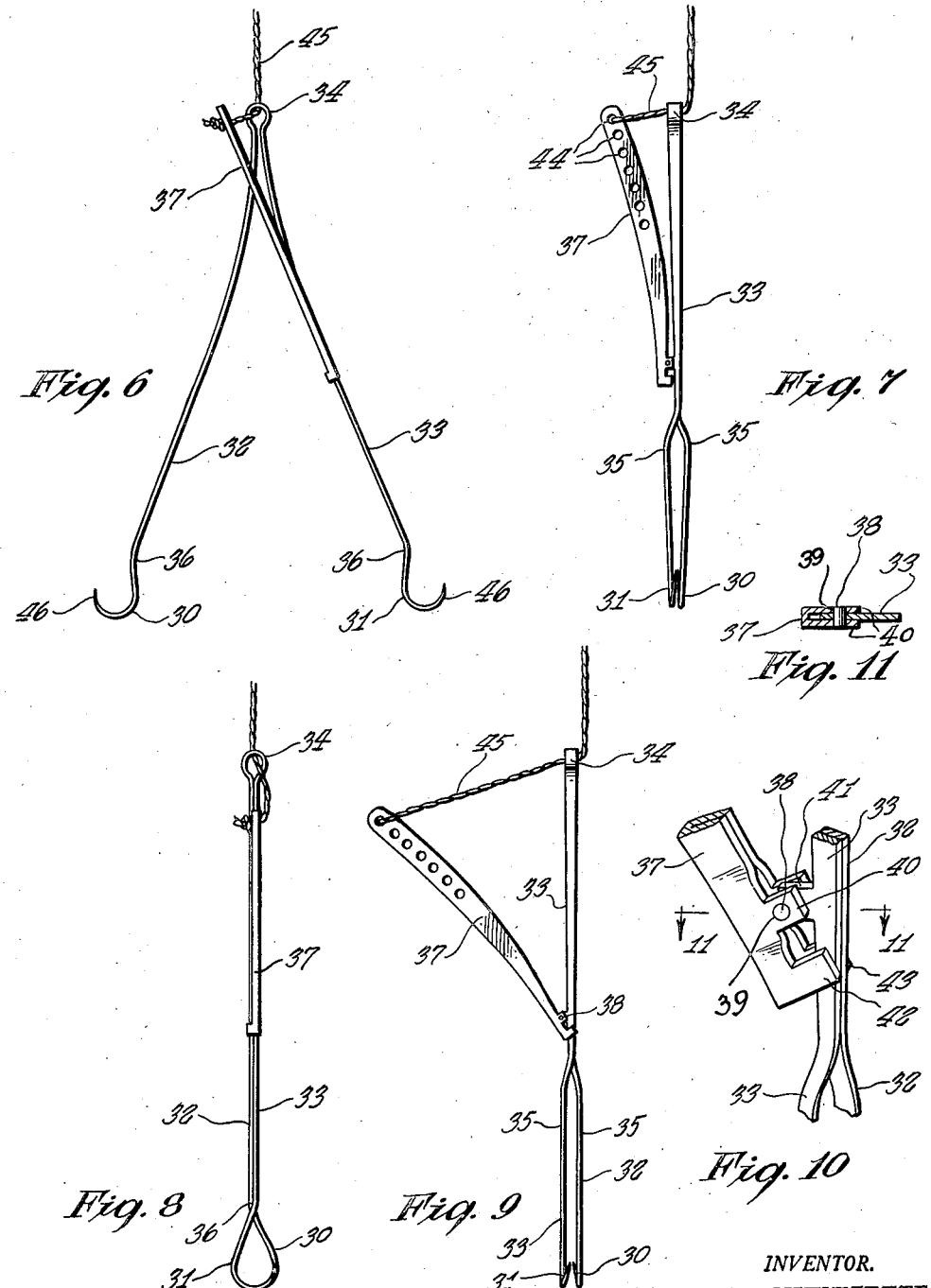

Patented May 2, 1950

2,506,137

UNITED STATES PATENT OFFICE 2,506,137

SPRING ACTUATED FISHHOOK

Edmond Chenette, South Norwalk, Conn.

Application February 15, 1947, Serial No. 728,779

3 Claims. (Cl. 43—36)

This invention relates to fish hooks and has particular reference to an improved fish hook consisting of a pair of hook elements which are automatically moved in opposite direction when struck by a fish so as to securely fasten the same within the mouth of the fish and prevent them from becoming disengaged therefrom when reeling or pulling in the line.

The invention has for an object the provision of a fish hook having reversely directed hook elements tensioned for movement in opposite directions to dispose the pointed terminals thereof in outwardly directed relation and which are released from adjacent relation by a pull on the hook elements to thereby spread the same apart in the fish's mouth and securely engage in opposite walls thereof.

The invention has for a further object the provision of a fish hook of the indicated character having angulated spring shanks secured together and normally disposed with the outer portions thereof together with the hook elements arranged in divergent relation and the pointed ends located outwardly and retained in tensioned adjacent relation by a latch bar pivoted to one of the shanks and adapted to engage the other shank and to be released therefrom by a pull on the hook elements.

With the foregoing and other objects in view reference is now made to the following specification and accompanying drawings in which the preferred embodiment of the invention is illustrated.

In the drawings:

Fig. 1 is a view in elevation of a fish hook constructed in accordance with the invention and illustrating the same with the hook elements in open or released relation.

Fig. 2 is a side view thereof.

Fig. 3 is a view similar to Fig. 1 with the hook elements in closed latched relation.

Fig. 4 is a side view of the same in closed latched relation.

Fig. 5 is a fragmentary view taken approximately on line 5—5 of Fig. 1.

Fig. 6 is a view in elevation of a modified form of fish hook constructed in accordance with the invention and illustrating the same with the hook elements in open or released relation.

Fig. 7 is a side view thereof.

Fig. 8 is a view in elevation with the hooks shown in closed or latched relation.

Fig. 9 is a side view of the same in closed or latched relation.

Fig. 10 is an enlarged fragmentary perspective view showing the latch in latched engagement.

Fig. 11 is a sectional view taken approximately on line 11—11 of Fig. 10.

Referring to the drawings by characters of reference, the fish hook includes a pair of hook elements 10 and 11 formed at the outer free ends of angulated spring shanks 12 and 13 respectively and which are provided with pointed terminals 14. The said shanks include divergent outer portions 15 and 16 respectively and parallel inner end portions 17 and 18 which are welded or otherwise secured together. The outer end portions 15 and 16 are normally retained in divergent relation by the inherent spring tension of the shanks 12 and 13 but are capable of being flexed inwardly into adjacent side by side relation.

In order to provide means for retaining the hook elements 10 and 11 in tensioned side by side adjacent relation for outward swinging movement, a latch bar 19 is pivotally connected with the shank 12 intermediate the ends of the outer portion 15 thereof on a pivot pin 20 which extends through an apertured lug 21 projecting outwardly on the side edge of the shank 12 at a right angle to the plane of the hook elements 10 and 11.

The latch bar 19 is of longitudinally bowed formation and has lateral swinging movement with reference to the shanks 12 and 13 so as to dispose the latch end 22 thereof in latched engagement with the outer end portions 15 and 16 when the latch bar is swung outawrdly at the upper end. The latch end 22 is of channel shaped formation in cross-section having oppositely disposed side wall portions 23 and 24 adapted to receive the outer end portions 15 and 16 of the shanks in protruding relation therethrough when same are inwardly flexed into side by side relation against the tension of said shanks. When the normally divergent outer end portions 15 and 16 of the shanks are thus disposed in latched side by side relation, the pointed terminals 14 curve outwardly in opposite direction and when released the same spring apart to divergent relation with the pointed terminals spaced apart and pointing outwardly in opposite direction to engage in the opposite walls of the mouth of the fish striking the hook.

The latch bar 19 is provided with an apertured upper end 25 to which a fish line 26 is secured and reeved through an eye 27 in the upper end of the shank 13. By this construction and arrangement a pull on the hook elements 10 and 11 as when engaged by a fish striking the same, effects the inward swinging of the latch bar 19 to thereby release the outer end portions 15 and 16 of the shanks from the latch end 22 into outward swinging divergent relation. Preferably the hook elements 10 and 11 are bent laterally at their juncture with the outer end portions 15 and 16 so that the same cross each other when arranged in tensioned side by side latched relation.

The outer end portions 15 and 16 of the shanks are offset laterally outward in opposite directions adjacent their outer ends in order to permit of the movement of the hook elements 10 and 11 thereof into side by side relation as hereinbefore described.

In the form of the invention illustrated in Figs. 6 to 11 inclusive of the drawings, the fish hook consists of hook elements 30 and 31 formed at the outer ends of normally divergent spring shanks 32 and 33 which are integrally connected together at their upper ends by a spring loop 34. The spring shanks 32 and 33 are offset laterally outward in opposite directions at their lower ends as at 35 in order to permit of inward flexing of the spring shanks with the upper portions thereof from their upper ends to the offset portion 35 disposed in parallel abutting engagement and with the hook elements 30 and 31 arranged in spaced side by side relation. The hook elements 30 and 31 are bent inwardly at their juncture 36 with the spring shanks 32 and 33 so that the hook elements cross each other when the shanks are flexed inwardly to dispose the hook elements in side by side relation. A latch bar 37 similar to the latch bar 19 in the previous form of the invention is pivotally connected to the shank 33 on a pivot pin 38 extending through aligned openings 39 in bifurcated lugs 40 at the lower end of said bar and through a lug 41 projecting laterally from the side edge of the spring shank 33 and engaging between the said bifurcated lugs 40. The latch bar 37 is formed with a bifurcated lower end, the furcations 42 and 43 being adapted to be swung into straddling relation with the spring shanks 32 and 33 between the pivotal connection of the latch bar with the shank 33 and the upper ends of the offset portions 35 of the spring shanks when the same are flexed inwardly into side by side parallel relation against the tension thereof.

The latch bar 37 is formed with a series of longitudinally spaced openings 44 adjacent the upper end thereof for selective engagement by a fish line 45 which is reeved through the spring loop 34. In accordance with this construction a pull on the upper end of the line 45 as when the hook elements 30 and 31 are engaged by a fish, effects the inward swinging of the latch bar 37 to release the spring shanks 32 and 33 from engagement between the furcations 42 and 43 to thereby release the spring shanks from latched side by side relation for swinging movement into outwardly divergent relation. The fish line 45 may be secured in any one of the openings 44 so as to vary the pull on the hook elements 30 and 31 to effect inward swinging of the latch bar 37. By this construction the hook may be adjusted for fishing for different kinds of fish having varying degrees of pull when striking the hook.

In use the hook elements 30 and 31 as in the previous form of the invention are baited and swung inwardly into side by side relation and then latched by the outward swinging of the latch bar 37 to thereby retain the hook elements 30 and 31 in adjacent side by side relation with the offset portions 35 thereof crossing each other at the juncture with the hook elements 30 and 31. When thus disposed in latched engagement the hook elements 30 and 31 have their pointed terminals 46 projecting in opposite directions and when the hook elements are released by the inward swinging of the latch bar 37 the spring shanks 32 and 33 will spring outwardly so as to engage the terminals 46 of the hook elements 30 and 31 in opposite walls of the mouth of a fish striking the bait. This construction eliminates the necessity of utilizing barbed fish hooks which are difficult to disengage from the mouth of the fish and frequently result in injury to undersized fish which must be returned. In the present construction the hook elements 10 and 11 and 30 and 31 in the two forms of the invention may be readily disengaged from the mouth of the fish by inward flexing of the spring shanks thereof.

What is claimed is:

1. In an automatic fish hook, a member having an inner end portion and divergent outer end portions formed with hook elements at the outer free ends thereof, said outer end portions being normally retained in said divergent relation by the inherent spring tension of said member and capable of being flexed into side by side substantially parallel relation, and a latch bar pivotally connected to the side edge of one of said outer end portions on a cross pin extending through aligned openings in said bar and end portions and having a latch at its free outer end adjacent said pivotal connection adapted to engage over the other outer end portion when arranged in said side by side relation and when the opposite end of the latch bar is swung outwardly on its pivotal connection, said member having an apertured upper end through which a fish line is adapted to be reeved for securing the end of the line to said latch bar for moving the same on its pivotal connection when the hook elements are engaged by a fish to thereby swing the latch bar to release the said outer end portions from engagement with the latch for outward swinging movement of the said outer end portions of the hook elements into divergent relation and said latch bar having a plurality of openings spaced at varying distances from said pivotal connection for securing the fish line to said bar through any one of said openings for selectively varying the pull on the hook elements to effect inward swinging of the latch bar.

2. In an automatic fish hook, a member having an inner end portion and divergent outer end portions formed with hook elements at the outer free ends thereof, said outer end portions being offset laterally in opposite directions adjacent their outer ends to permit of the flexing of said outer end portions against the tension of said member to dispose the hook elements in side by side relation, and a latch bar pivotally connected to the side edge of one of said outer end portions on a cross pin extending through aligned openings in said bar and end portions and having a latch at its free outer end adjacent said pivotal connection adapted to engage over the other outer end portion when arranged in said side by side relation and when the opposite end of the latch bar is swung outwardly on its pivotal connection, said member having an apertured upper end through which a fish line is adapted to be reeved for securing the end of the line to said latch bar for moving the same on its pivotal connection when the hook elements are engaged by a fish to thereby swing the latch bar to release the said outer end portions from engagement with the latch for outward swinging movement of the said outer end portions of the hook elements into divergent relation and said latch bar having a plurality of openings spaced at varying distances from said pivotal connection for securing the fish line to said bar through any one of said openings for selectively varying the pull on the hook elements to effect inward swinging of the latch bar.

3. In an automatic fish hook, a pair of spring shanks connected together and normally tensioned for movement from adjacent relation to outwardly divergent relation, said spring shanks having hook elements at the outer free ends thereof provided with pointed terminals projecting outwardly in opposite directions and said spring shanks having their lower end portions offset laterally in opposite directions to permit of the flexing of said shanks into side by side substantially parallel relation, and a latch bar pivotally connected to one of said spring shanks on a cross pin extending through aligned openings in said bar and shank and having a latch adapted to engage over the other spring shank when the shanks are arranged in said side by side relation and when the bar is swung outwardly on its pivotal connection, and said fish hook having guide means in the upper end thereof through which a fish line is adapted to be reeved with the lower end thereof secured to said latch bar for moving the same on its pivotal connection to release the latch for outward swinging movement of said spring shanks into divergent relation and said latch bar having a plurality of openings spaced at varying distances from said pivotal connection for securing the fish line to said bar through any one of said openings for selectively varying the pull on the hook elements to effect inward swinging of the latch bar.

EDMOND CHENETTE.

REFERENCES CITED

The following references are of record in the file of this patent:

UNITED STATES PATENTS

| Number | Name | Date |
| --- | --- | --- |
| 465,940 | Meinhardt | Dec. 29, 1891 |
| 534,694 | Kienle | Feb. 26, 1895 |
| 650,277 | Rossner | May 22, 1900 |
| 684,211 | Feich | Oct. 8, 1901 |
| 922,879 | Gabrielson | May 25, 1909 |
| 2,209,300 | Shipman | July 23, 1940 |
| 2,223,946 | Binkowski | Dec. 3, 1940 |